United States Patent
Yang et al.

(10) Patent No.: US 11,485,831 B2
(45) Date of Patent: Nov. 1, 2022

(54) PRIMERLESS PAINT COMPOSITION, METHODS OF MANUFACTURE THEREOF AND ARTICLES COMPRISING THE SAME

(71) Applicants: DOW GLOBAL TECHNOLOGIES LLC, Midland, MI (US); Hong Yang, Shanghai (CN)

(72) Inventors: Hong Yang, Shanghai (CN); Tao Han, Shanghai (CN); Haiyang Yu, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 818 days.

(21) Appl. No.: 15/033,747

(22) PCT Filed: Nov. 8, 2013

(86) PCT No.: PCT/CN2013/086793
§ 371 (c)(1),
(2) Date: May 2, 2016

(87) PCT Pub. No.: WO2015/066899
PCT Pub. Date: May 14, 2015

(65) Prior Publication Data
US 2016/0257836 A1 Sep. 8, 2016

(51) Int. Cl.
*C09D 123/28* (2006.01)
*C09D 153/02* (2006.01)
(Continued)

(52) U.S. Cl.
CPC ............... *C08J 7/043* (2020.01); *B05D 7/02* (2013.01); *C08J 7/046* (2020.01); *C08J 7/0427* (2020.01);
(Continued)

(58) Field of Classification Search
CPC combination set(s) only.
See application file for complete search history.

(56) References Cited

U.S. PATENT DOCUMENTS 4,874,818 A * 10/1989 Yamamoto ............ C08F 287/00
525/183
4,880,873 A * 11/1989 Sagane .................... C08J 5/124
525/61
(Continued)

FOREIGN PATENT DOCUMENTS

CA 2426039 A1 5/2002
CN 101035815 A 9/2007
(Continued)

OTHER PUBLICATIONS

Andrey V. Dobrynin; Phase Coexistence in Random Copolymers; J. Chem Phys., V. 107, Issue 21, Dec. 1, 1997; pp. 9234-9238.
(Continued)

*Primary Examiner* — Michael L Leonard
(74) *Attorney, Agent, or Firm* — Cantor Colburn LLP

(57) ABSTRACT

Disclosed herein is a primerless paint composition comprising a carboxylated chlorinated polyolefin elastomer; one or more of a polyacrylic binder, a polyvinylchloride binder and a vinyl aromatic block copolymer binder; a pigment; and a liquid carrier. Disclosed herein too is a method comprising blending a primerless paint composition comprising a carboxylated chlorinated polyolefin elastomer; one or more of a polyacrylic binder, polyvinylchloride binder and a vinyl aromatic block copolymer binder; a pigment; and a liquid carrier; and disposing the primerless paint composition on a polyolefin elastomer substrate that does not have a primer disposed on it prior to the disposing of the primerless paint composition.

6 Claims, 8 Drawing Sheets

(51) Int. Cl.
| | |
|---|---|
| C08J 7/043 | (2020.01) |
| C09D 133/08 | (2006.01) |
| C09D 153/00 | (2006.01) |
| C08J 7/04 | (2020.01) |
| C08J 7/046 | (2020.01) |
| B05D 7/02 | (2006.01) |
| C09D 127/06 | (2006.01) |
| C09D 131/04 | (2006.01) |

(52) U.S. Cl.
CPC ....... *C09D 123/28* (2013.01); *C09D 123/283* (2013.01); *C09D 127/06* (2013.01); *C09D 131/04* (2013.01); *C09D 133/08* (2013.01); *C09D 153/00* (2013.01); *C09D 153/02* (2013.01); *C08J 2323/02* (2013.01); *C08J 2323/06* (2013.01); *C08J 2323/12* (2013.01); *C08J 2413/00* (2013.01); *C08J 2423/26* (2013.01); *C08J 2423/28* (2013.01); *C08J 2427/06* (2013.01); *C08J 2431/04* (2013.01); *C08J 2433/02* (2013.01); *C08J 2433/08* (2013.01); *C08J 2453/02* (2013.01)

(56) References Cited

U.S. PATENT DOCUMENTS

| | | | |
|---|---|---|---|
| 4,954,573 | A | 9/1990 | Fry et al. |
| 5,272,236 | A | 12/1993 | Lai et al. |
| 5,278,272 | A | 1/1994 | Lai et al. |
| 5,436,079 | A | 7/1995 | Brugel |
| 5,504,172 | A | 4/1996 | Imuta et al. |
| 5,783,638 | A | 7/1998 | Lai et al. |
| 5,986,028 | A | 11/1999 | Lai et al. |
| 6,046,279 | A | 4/2000 | Roberts et al. |
| 6,262,182 | B1 | 7/2001 | Eagan et al. |
| 6,525,157 | B2 | 2/2003 | Cozewith et al. |
| 6,960,635 | B2 | 11/2005 | Stevens et al. |
| 7,045,574 | B1* | 5/2006 | Funakoshi ................ C08F 8/00 525/64 |
| 7,163,981 | B2 | 1/2007 | Kubish et al. |
| 7,199,203 | B2 | 4/2007 | Stevens et al. |
| 7,355,089 | B2 | 4/2008 | Chang et al. |
| 7,504,347 | B2 | 3/2009 | Poon et al. |
| 7,514,517 | B2 | 4/2009 | Hoenig et al. |
| 7,524,911 | B2 | 4/2009 | Karjala et al. |
| 7,579,408 | B2 | 8/2009 | Walton et al. |
| 7,582,716 | B2 | 9/2009 | Liang et al. |
| 7,608,668 | B2 | 10/2009 | Li Pi Shan et al. |
| 8,420,760 | B2 | 4/2013 | Hughes et al. |
| 2005/0119400 | A1 | 6/2005 | Ortmeier et al. |
| 2006/0074181 | A1 | 4/2006 | Eagan et al. |
| 2006/0188654 | A1* | 8/2006 | Onoyama ............ C09C 1/3676 524/497 |
| 2006/0199930 | A1 | 9/2006 | Li Pi Shan et al. |
| 2006/0293424 | A1* | 12/2006 | Tse ................ C08F 255/02 524/270 |
| 2007/0259123 | A1* | 11/2007 | Nagano ............... C08F 255/00 524/414 |
| 2009/0004487 | A1 | 1/2009 | Katsuta et al. |
| 2010/0285253 | A1 | 11/2010 | Hughes et al. |
| 2011/0135936 | A1 | 6/2011 | Katsuta et al. |
| 2012/0308752 | A1 | 12/2012 | He et al. |

FOREIGN PATENT DOCUMENTS

| | | |
|---|---|---|
| CN | 101250368 A | 8/2008 |
| EP | 1153996 A1 | 11/2001 |
| EP | 2009071 A1 | 12/2008 |
| JP | S5543031 B2 | 11/1980 |
| JP | S5817174 A | 2/1983 |
| JP | S5953305 B2 | 12/1984 |
| JP | S6017381 B2 | 5/1985 |
| JP | S60123565 A | 7/1985 |
| JP | S60124667 A | 7/1985 |
| JP | S6112937 B2 | 4/1986 |
| JP | S6112940 B2 | 4/1986 |
| JP | S63191867 A | 8/1988 |
| JP | S648671 B2 | 2/1989 |
| JP | H0143785 B2 | 9/1989 |
| JP | H0237951 B2 | 8/1990 |
| JP | H0238618 B2 | 8/1990 |
| JP | H0369951 B2 | 11/1991 |
| JP | H0489828 A | 3/1992 |
| JP | H0489829 A | 3/1992 |
| JP | H04248845 A | 9/1992 |
| JP | H05239292 A | 9/1993 |
| JP | H0776646 A | 3/1995 |
| JP | H07196979 A | 8/1995 |
| JP | H07278488 A | 10/1995 |
| JP | H083507 A | 1/1996 |
| JP | 2518456 B2 | 7/1996 |
| JP | 2652297 B2 | 9/1997 |
| JP | H10101988 A | 4/1998 |
| JP | H10176137 A | 6/1998 |
| JP | H10259367 A | 9/1998 |
| JP | 2816617 B2 | 10/1998 |
| JP | H11131011 A | 5/1999 |
| JP | 3074673 B2 | 8/2000 |
| JP | 2001031820 A | 2/2001 |
| JP | 2001288400 A | 10/2001 |
| JP | 2002338877 A | 11/2002 |
| JP | 3363332 B2 | 1/2003 |
| JP | 3436903 B2 | 8/2003 |
| JP | 3523281 B2 | 4/2004 |
| JP | 3523282 B2 | 4/2004 |
| JP | 2004256577 A | 9/2004 |
| JP | 3862865 B2 | 12/2006 |
| JP | 2007238719 A | 9/2007 |
| JP | 2007302709 A | 11/2007 |
| JP | 2010111879 A | 5/2010 |
| JP | 4572723 B2 | 11/2010 |
| JP | 2012193320 A | 10/2012 |
| WO | 2000001745 A1 | 1/2000 |
| WO | 2005090427 A2 | 9/2005 |
| WO | 2009067337 A1 | 5/2009 |

OTHER PUBLICATIONS

George Wypych; Handbook of Plasticizers; Chemtec Publishing; 2004; 693 pgs.

I. I. Potemkin, et al.; Microphase Separation in Correlated Random Copolymers: Mean-Field Theory and Fluctuation Corrections; Physical Review E, vol. 57, No. 6; Jun. 1998; pp. 6902-6912.

James C. Randall; A Review of High Resolution Liquid Carbon Nuclear Magnetic Resonance Characterizations of Ethylene-Based Polymers; Rev. Macromol. Chem. Phys., C29(2 & 3), 1989, pp. 201-317.

International Search Report and Written Opinion for International Application Serial No. PCT/CN2013/086793, international Filing Date Nov. 8, 2013, Report dated Aug. 15, 2014 (13 Pages).

Extended European Search Report for EP Application No. 13897223. 7; Report dated Jul. 31, 2017 (7 pages).

Kraton; "Versatile Solutions for Synthetic & Natural Based Oils; Polymers for Oil Modifications"; Oil Gels for Synthetic & Natural Based Oils; Accessed Jan. 2021, 10 pages.

Marzio, "The Glass Temperature of Polymer Blends"; ScienceDirect; vol. 31, Issue 12; Dec. 1990, 1 page.

* cited by examiner

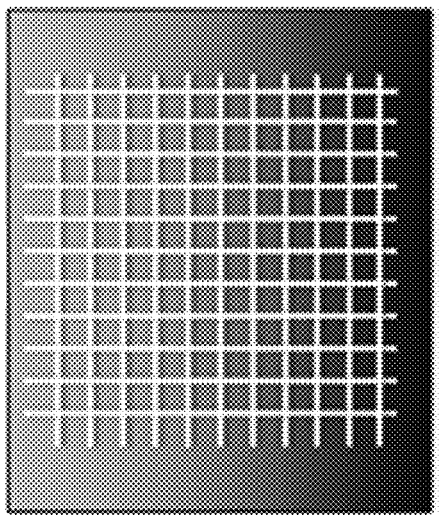
Figure 3(B)
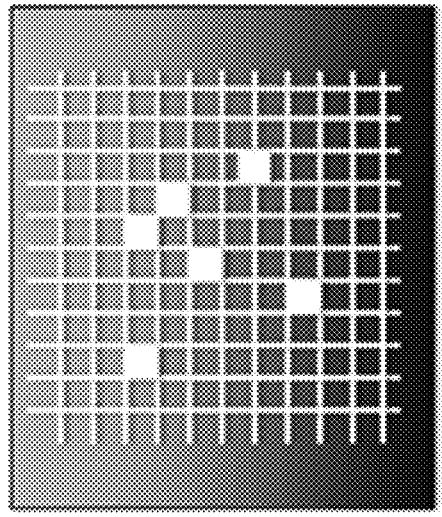
Figure 3 (E)
Peel direction
Figure 3(D)
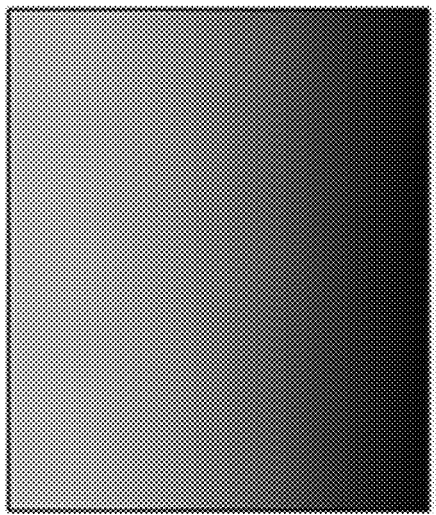
Figure 3(A)
Figure 3(C)

Inventive one-step Acrylic paint

Inventive one-step Acrylic paint

Inventive one-step SBS paint

Inventive one-step SBS paint

PRIMERLESS PAINT COMPOSITION, METHODS OF MANUFACTURE THEREOF AND ARTICLES COMPRISING THE SAME

CROSS REFERENCE TO RELATED APPLICATIONS

This application is a U.S. National Stage Application of International Application Serial No. PCT/CN13/086793 filed Nov. 8, 2013, the content of which is incorporated by reference herein in its entirety.

BACKGROUND

Disclosed herein is a primerless paint composition, methods of manufacture thereof and articles comprising the same.

Growing consumer demand for safer, polyvinylchloride (PVC)-free children's products has caused major toy brand manufacturers to phase out the use of PVC and to offer PVC-free products. Due to environmental regulations and market trends, polyolefin elastomers (POEs) are becoming more popular in toys and infant product applications.

However, the application of paint to polyolefin substrates remains a challenging task because of the lack of polar functional groups on the polyolefin substrate and because of the subsequent low surface energy surface coatings. This limitation has resulted in limited adoption of polyolefin elastomers in paintable toys, which represents a large portion of the plastic toys market.

PVC based paints work very well for PVC substrates but not for polyolefin substrates due to poor adhesion. Acrylic polymer based paints are widely used in different applications, but these acrylic based paints also display a lack of adhesion to polyolefin substrates. In addition, the acrylic polymer based paints are too brittle for polyolefin elastomer substrates and as a result are easily damaged during use.

Thermoplastic rubber (TPR) based paints are also used to coat a variety of commercial products. These thermoplastic rubber based paints comprise polystyrene-butene-polystyrene (SBS) resins, which imparts flexibility of the paint. However, these TPR based paints also display adhesion problems to polyolefin elastomer substrates. In order to enhance adhesion to the polyolefin elastomer substrates, several steps may be taken. These include 1) surface pre-treatment of the polyolefin elastomer substrate, such as plasma, flame, chemical etching, and the like; 2) bulk modification by incorporating polar ingredients (e.g. poly-urethane) into the substrate; and 3) use a primer that functions as a tie-layer between the substrate and paint. However, all of these methods add additional manufacturing steps and costs to the product.

Painting is often the most labor intensive and complicated step during a products manufacturing. Using a primer as a tie-layer between the substrate and paint can improve the adhesion of the paint to the polyolefin elastomer substrate, but significantly increases the cost. It is therefore desirable to use primerless paints that have good adhesion with the polyolefin elastomer substrates to reduce the cost of manufactured goods.

SUMMARY

Disclosed herein is a primerless paint composition comprising a carboxylated chlorinated polyolefin elastomer; one or more of a polyacrylic binder, a polyvinylchloride binder and a vinyl aromatic block copolymer binder; a pigment; and a liquid carrier.

Disclosed herein too is a method comprising blending a primerless paint composition comprising a carboxylated chlorinated polyolefin elastomer; one or more of a poly-acrylic binder, polyvinylchloride binder and a vinyl aromatic block copolymer binder; a pigment; and a liquid carrier; and disposing the primerless paint composition on a polyolefin elastomer substrate that does not have a primer disposed on it prior to the disposing of the primerless paint composition.

BRIEF DESCRIPTION OF THE FIGURES

FIG. 3 (A) shows the cross-hatch testing schematic for a painted plaque;

FIG. 3 (B) depicts scribed squares for a painted plaque;

FIG. 3 (C) depicts applying tape to the surface of a painted plaque with squares scribed thereon;

FIG. 3 (D) depicts removal of tape from the surface of a painted plaque with squares scribed thereon;

FIG. 3 (E) depicts checking the percentage of squares with paint removed from the surface of a painted plaque with squares scribed thereon;

DETAILED DESCRIPTION

Figure 1:
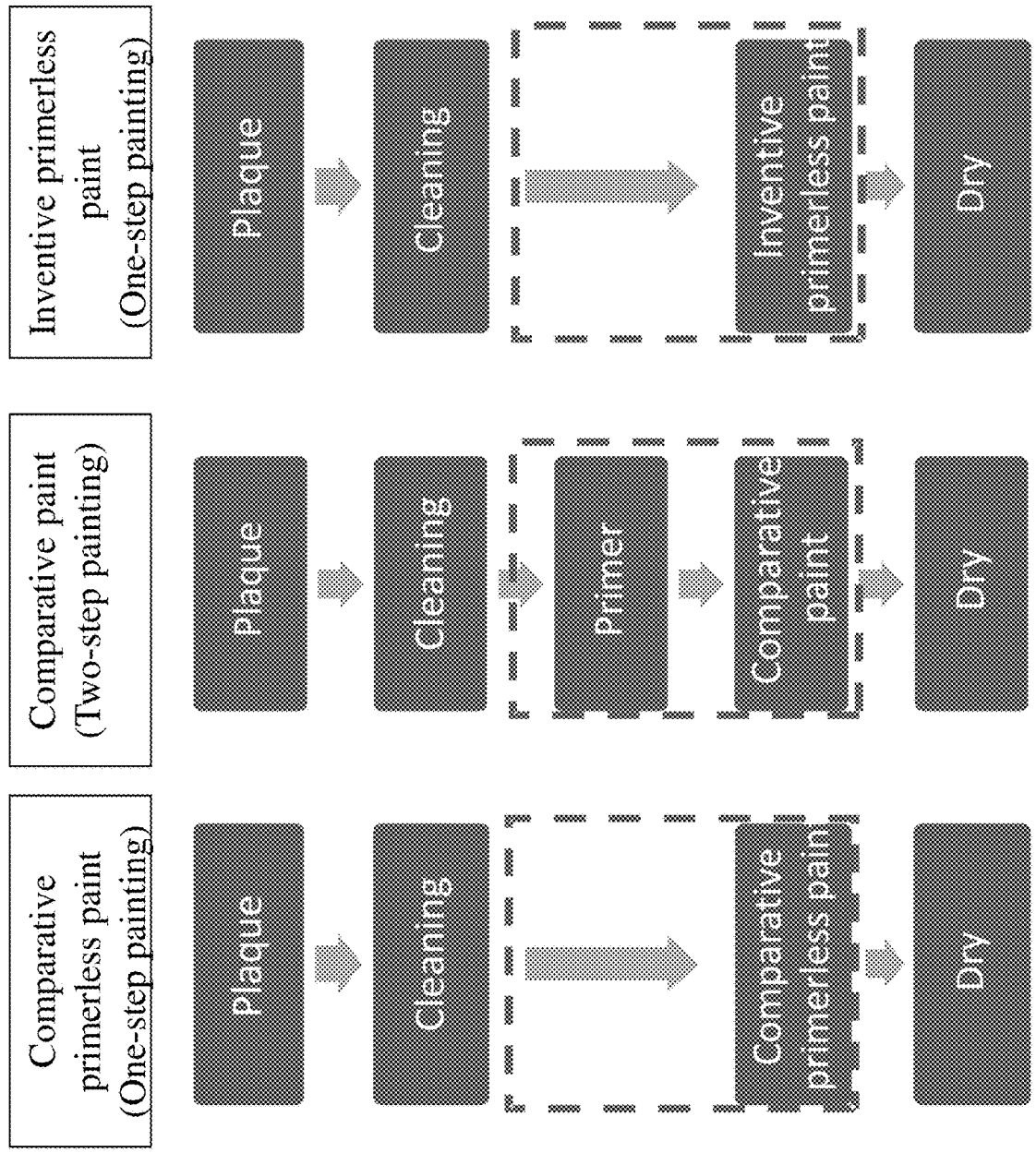
FIG. 1 contains a process map of the methods in which the various substrates were painted.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

"Composition", "formulation" and like terms means a mixture or blend of two or more components. In the context of the inventive compositions of this invention, the mixture or blend of materials include a polyolefin and an ethylene-olefin interpolymer and, optionally, one or more fillers or additives.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Such blends include both mechanical blends made by admixing two or more of the components together in any mechanical manner, e.g., stirring, tumbling, folding, etc., and in-situ or in-reactor blends made by forming and/or mixing the blend components together during the polymerization process in which the polymer components are made.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, and the like.

"Olefin-based polymer", "polyolefin" and like terms mean a polymer containing, in polymerized form, a majority weight percent of an olefin, for example ethylene or propylene, based on the total weight of the polymer. Non-limiting examples of olefin-based polymers include ethylene-based polymers and propylene-based polymers.

"Random ethylene-α-olefin interpolymers", "homogeneous interpolymers" and like terms mean an interpolymer or interpolymer in which the comonomer is randomly distributed within a given interpolymer molecule and in which the majority, if not substantially all, of the interpolymer molecules of the bulk polymer have the same or essentially the same ethylene/comonomer ratio within that interpolymer. In contrast, non-random or heterogeneous interpolymers are interpolymers in which the majority of the interpolymer molecules of the bulk polymer do not have the same or essentially the same ethylene/comonomer ratio.

"Bulk polymer" and like terms mean the polymer which results from the polymerization process.

"Plasticizer" and like terms mean an additive that can increase the flexibility and lower the glass transition temperature of a polymer thus increasing the flexibility and softening the feel of an article made from the polymer. Exemplary plasticizers include mineral oils, abietates, adipates, alkyl sulfonates, azelates, benzoates, chlorinated paraffins, citrates, epoxides, glycol ethers and their esters, glutarates, polybutenes, ricinoleates, hydrocarbon oils, isobutyrates, oleates, pentaerythritol derivates, phosphates, phthalates, esters, sebacates, sulfonamides, tri- and pryromellitates, biphenyl derivates, stearates, difuran diesters, fluorine-containing polymers, and the like. Where used, the amount of the plasticizer in the polymer blend can be from greater than 0 to 15 wt %, from 0.5 to 10 wt %, or from 1 to 5 wt % of the total weight of the polymer blend. Some plasticizers are described in George Wypych, "Handbook of Plasticizers" ChemTec Publishing, Toronto-Scarborough, Ontario (2004).

"Phthalate-based plasticizer" and like terms mean an additive based on an ester of phthalic acid or similar compound. Common phthalate-based plasticizers include bis(2-ethylhexyl) phthalate, diisononyl phthalate, bis(n-butyl) phthalate, butyl benzyl phthalate and diisodecyl phthalate.

"Free of and like terms mean that if a composition, paint or the like contains any amount of a particular substance, then the amount of that substance that it does contain is less than the amount allowed by a particular government regulation, customer specification, or the like.

Ranges may be expressed herein as from about one particular value, and/or to about another particular value. When such a range is expressed, it is to be understood that another embodiment is from the one particular value and/or to the other particular value, along with all combinations within said range.

Disclosed herein is a primerless paint composition that comprises a carboxylated soft chlorinated polyolefin elastomer (hereinafter a carboxylated chlorinated polyolefin) and one or more of an acrylic polymer, a polyvinylchloride binder and a thermoplastic rubber. The primerless paint composition may additionally contain a pigment and an organic solvent. In one embodiment, the thermoplastic rubber is copolymer that comprises a vinyl aromatic polymer and an olefin polymer. This composition is advantageous in that it may be used without a primer on a substrate that comprises a polyolefin (e.g., a polyolefin elastomer substrate) thereby decreasing material and manufacturing costs. In one embodiment, the primerless paint composition does not contain a polyvinylchloride. In another embodiment, the primerless paint composition does contain a polyvinylchloride. The presence of the carboxylated chlorinated polyolefin facilitates adhesion to a variety of substrates, particularly substrates that contains polyolefins. The primerless paint composition may be used on polyolefin substrates or polyolefin elastomer substrates that do not have a primer disposed on them or have been subjected to a surface pretreatment involving plasma, flame, chemical etching, or the like, prior to applying the paint composition. In short, there is no need to pretreat the substrate prior to the application of paint.

Disclosed herein too is a method of manufacturing the primerless paint composition. The method comprises blending the carboxylated chlorinated polyolefin, the maleic anhydride modified polyolefin and one or more of an acrylic polymer and a thermoplastic rubber; and optionally a pigment and an organic solvent. The primerless paint composition may then be applied to a substrate by a variety of different methods including brush coating, spray painting, dip coating, spin casting, and the like.

The carboxylated chlorinated polyolefin may comprise a linear polymer or a crosslinked polymer and has an elastic modulus of less than 100 megapascals (MPa), specifically less than 50 MPa, and more specifically less than 20 MPa. This low elastic modulus results in a polyolefin that is soft to the touch and that facilitates adhesion between the paint and the substrate upon which the paint is disposed.

The carboxylated chlorinated polyolefin (i.e., the carboxylated soft chlorinated polyolefin elastomer) is prepared by reacting a polyolefin with one or more of unsaturated carboxylic esters, unsaturated carboxylic acids, unsaturated carboxylic anhydrides, vinyl monomers, acrylic monomers, or mixtures thereof to form a carboxylated polyolefin. The carboxylated polyolefin is then chlorinated by reaction with at least one chlorinating agent to form a chlorinated polyolefin. The chlorinating agent can be any that is capable of chlorinating polyolefins. However, the order of these two steps is not critical. In an exemplary embodiment, the carboxylated chlorinated polyolefin is prepared by chlorinating the polyolefin prior to the introduction of the carboxyl-containing compounds. An exemplary carboxylated chlorinated polyolefin is a maleic anhydride modified polyolefin.

The polyolefin used to manufacture the carboxylated chlorinated polyolefin are ethylene-α-olefin random interpolymers, ethylene-α-olefin block interpolymers, homogenous polypropylene and propylene-α-olefin random interpolymers, block interpolymers, or a combination thereof.

Ethylene-α-olefin random interpolymers used in the practice of this invention comprise a majority weight percent polymerized ethylene monomer (based on the total weight of polymerizable monomers), and at least one polymerized α-olefin comonomer. These random polyolefins have a density of less than 0.91, specifically less than 0.90, more specifically less than 0.89, and even more specifically less than 0.88, g/cm$^3$. Low density polyolefin interpolymers are generally characterized as amorphous, flexible and having good optical properties, e.g., high transmission of visible and UV-light and low haze. The ethylene-α-olefin random interpolymers used herein have a melt index $I_2$ of 0.1 to 50, more typically 0.2 to 30, g/10 min, when measured as per ASTM D1238 at 230° C.

In one embodiment, the polyolefin random interpolymers are made with a single site catalyst such as a metallocene catalyst or a constrained geometry catalyst. The ethylene-α-olefin random interpolymers are made with a single-site catalyst, and have a melting point of less than 95, specifically less than 90, more specifically less than 85, even more specifically less than 80 and still more specifically less than 75° C. The melting point is measured by differential scanning calorimetry (DSC) as described, for example, in U.S. Pat. No. 5,783,638. Polyolefin random interpolymers with a low melting point often exhibit desirable flexibility and elastic properties.

The polyolefin random interpolymers include ethylene-α-olefin interpolymers having an α-olefin content of between 10 and 20, specifically at least 11 and even more specifically at least 12, mole percent as measured by 13C nuclear magnetic resonance (NMR) spectroscopy using the procedure described in Randall (Rev. Macromol. Chem. Phys., C29 (2&3)). Generally, the greater the α-olefin content of the interpolymer, the lower the density and the more amorphous the interpolymer.

The α-olefin is specifically a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, are α-olefins and can be used in place of some or all of the α-olefins described above. Illustrative terpolymers include ethylene/propylene/1-octene, ethylene/propylene/butene and ethylene-/butene/1-octene.

More specific examples of olefinic random interpolymers useful for use as the carboxylated chlorinated elastomer include very low density polyethylene (VLDPE), homogeneously branched, linear ethylene-α-olefin interpolymers (e.g. TAFMER™ by Mitsui Petrochemicals Company Limited and EXACT™ by Exxon Chemical Company), and homogeneously branched, substantially linear ethylene-α-olefin polymers (e.g., AFFINITY™ and ENGAGE™ polyethylene resins available from The Dow Chemical Company). The more preferred polyolefin interpolymers are the homogeneously branched linear and substantially linear ethylene interpolymers. The substantially linear ethylene interpolymers are especially preferred, and are more fully described in U.S. Pat. Nos. 5,272,236, 5,278,272 and 5,986,028.

As detailed above, ethylene-α-olefin block interpolymers may also be carboxylated and chlorinated to form the carboxylated chlorinated polyolefins. "Multi-block interpolymer", "segmented interpolymer" and like terms refer to a polymer comprising two or more chemically distinct regions or segments (referred to as "blocks") preferably joined (e.g., covalently bonded or ionically bonded) in a linear manner, that is, a polymer comprising chemically differentiated units which are joined end-to-end with respect to polymerized ethylenic functionality, rather than in pendent or grafted fashion. In an exemplary embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. The multi-block interpolymers disclosed herein are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers desirably possess a polydispersity index (PDI) from 1.7 to 3.5, specifically from 1.8 to 3, more specifically from 1.8 to 2.5, and most specifically from 1.8 to 2.2. When produced in a batch or semi-batch process, the polymers desirably possess a PDI from 1.0 to 3.5, specifically from 1.3 to 3, more specifically from 1.4 to 2.5, and most specifically from 1.4 to 2.

The term "ethylene multi-block interpolymer" means a multi-block interpolymer comprising ethylene and one or more interpolymerizable comonomers, in which ethylene comprises a plurality of the polymerized monomer units of at least one block or segment in the polymer, specifically at least 90, more specifically at least 95 and most specifically at least 98, mole percent of the block. Based on total polymer weight, the ethylene multi-block interpolymers used in the practice of the present invention specifically have an ethylene content from 25 to 97, more specifically from 40 to 96, even more specifically from 55 to 95 and most specifically from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether or an alkane-solvent is less than 10, specifically less than 7, more specifically less than 5 and most specifically less than 2, percent of the total polymer weight.

In addition, the multi-block interpolymers used in the practice of the invention desirably possess a PDI fitting a Schutz-Flory distribution rather than a Poisson distribution. The use of the polymerization process described in WO 2005/090427 and U.S. Pat. No. 7,608,668 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, Physical Review E (1998) 57 (6), pp. 6902-6912, and Dobrynin, J. Chem. Phys. (1997) 107 (21), pp 9234-9238.

In a further embodiment, the polymers of the invention, especially those made in a continuous, solution polymerization reactor, possess a most probable distribution of block lengths. In one embodiment of this invention, the ethylene multi-block interpolymers are defined as having:

(a) Mw/Mn from about 1.7 to about 3.5, at least one melting point, Tm, in degrees Celsius, and a density, d, in grams/cubic centimeter, where in the numerical values of $T_m$ and d correspond to the relationship $$Tm > -2002.9 + 4538.5(d) - 2422.2(d)^2, \text{ or}$$

(b) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to } 130 \text{ J/g}$$

ΔT>48° C. for ΔH greater than 130 J/g wherein the CRYSTAF peak is determined using at least 5 percent of the cumulative polymer, and if less than 5 percent of the polymer has an identifiable CRYSTAF peak, then the CRYSTAF temperature is 30 C; or (c) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene-α-olefin interpolymer is substantially free of crosslinked phase:

$$Re > 1481 - 1629(d); \text{ or}$$

(d) Has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene-α-olefin interpolymer; or (e) Has a storage modulus at 25° C., G'(25° C.), and a storage modulus at 100° C., G'(100° C.), wherein the ratio of G'(25 C) to G'(100° C.) is in the range of about 1:1 to about 9:1.

The ethylene-α-olefin interpolymer may also have:

(a) Molecular fraction which elutes between 40° C. and 130° C. when fractionated using TREF, characterized in that the fraction has a block index of at least 0.5 and up to about 1 and a molecular weight distribution, Mw Mn, greater than about 1.3; or (b) Average block index greater than zero and up to about 1.0 and a molecular weight distribution, Mw/Mn greater than about 1.3.

Suitable monomers for use in preparing the ethylene multi-block interpolymers used in the practice of this present invention include ethylene and one or more addition polymerizable monomers other than ethylene. Examples of suitable comonomers include straight-chain or branched-olefins of 3 to 30, specifically 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, specifically 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; conjugated dienes such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1-6-octadiene, 4-ethylidene-8-methyl-1,7-nonadiene, 5,9-dimethyl-1,4,8-decatriene; 3-phenylpropene, 4-phenylpropene, 1,2-difluoroethylene, tetrafluoroethylene, and 3,3,3-trifluoro-1-propene.

Other ethylene multi-block interpolymers that can be used are elastomeric interpolymers of ethylene, a $C_{3-20}$ α-olefin, especially propylene, and, optionally, one or more diene monomers. Preferred α-olefin for use in this embodiment are designated by the formula $CH_2=CHR^*$, where $R^*$ is a linear or branched alkyl group of from 1 to 12 carbon atoms. Examples of suitable α-olefins include propylene, isobutylene, 1-butene, 1-pentene, 1-hexene, 4-methyl-1-pentene, and 1-octene. One particularly preferred α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Preferred dienes include 1,4-pentadiene, 1,4-hexadiene, 5-ethylidene-2-norbornene, dicyclopentadiene, cyclohexadiene, and 5-butylidene-2-norbornene. One particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers have a density of less than 0.90, specifically less than 0.89, more specifically less than 0.885, even more specifically less than 0.88 and even more specifically less than 0.875 g/cc. The ethylene multi-block interpolymers generally have a density greater than 0.85, and more specifically greater than 0.86 g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers useful in the practice of this invention have a 2% secant modulus of less than about 100, specifically less than about 80, more specifically less than about 50 and even more specifically less than about 20 MPa as measured by the procedure of ASTM D-882-02. The ethylene multi-block interpolymers typically have a 2% secant modulus of greater than zero, but the lower the modulus, the better the interpolymer is adapted for use in this primerless paint. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this invention because they provide stability under stress, e.g., less prone to crack upon stress or shrinkage.

The ethylene multi-block interpolymers generally have a melting point of less than about 125° C. The melting point is measured by the differential scanning calorimetry (DSC) method described in WO 2005/090427 (US2006/0199930). Ethylene multi-block interpolymers with a low melting point often exhibit desirable flexibility and thermoplasticity properties useful in the fabrication of the modules of this invention.

The ethylene multi-block interpolymers used in the practice of this invention, and their preparation and use, are more fully described in U.S. Pat. Nos. 7,579,408, 7,355,089, 7,524,911, 7,514,517, 7,582,716 and 7,504,347.

The polyolefin elastomers may also comprise random or block propylene polymers (i.e., polypropylenes). The random polypropylene elastomer typically comprises 90 or more mole percent units derived from propylene. The remainder of the units in the propylene copolymer is derived from units of at least one α-olefin. In the context of this invention, random polypropylene copolymers are not propylene-α-olefin interpolymers.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene-α-olefin interpolymer and is characterized as having substantially isotactic propylene sequences. The propylene-α-olefin interpolymers include propylene-based elastomers (PBE). "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The propylene-α-olefin copolymer comprises units derived from propylene and polymeric units derived from one or more α-olefin comonomers. Exemplary comonomers utilized to manufacture the propylene-α-olefin copolymer are $C_2$ and $C_4$ to $C_{10}$ α-olefins; for example, $C_2$, $C_4$, $C_6$ and $C_8$ α-olefins.

The propylene-α-olefin interpolymer comprises from 1 to 40 percent by weight of one or more alpha-olefin comonomers. All individual values and subranges from 1 to 40 weight percent are included herein and disclosed herein. The propylene-α-olefin interpolymer may have a melt flow rate in the range of from 0.1 to 500 grams per 10 minutes (g/10 min), measured in accordance with ASTM D-1238 (at 230° C./2.16 Kg). The propylene-α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene-α-olefin interpolymer has a density of typically less than 0.895 g/cm$^3$. The propylene-α-olefin interpolymer has a melting temperature ($T_m$) typically of less than 120° C. and a heat of fusion ($H_f$) typically of less than 70 Joules per gram (J/g) as measured by differential scanning calorimetry (DSC) as described in U.S. Pat. No. 7,199,203. The propylene-α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene-α-olefin interpolymers are further described in the U.S. Pat. Nos. 6,960,635 and 6,525,157, the entire contents of which are incorporated herein by reference. Such propylene-α-olefin interpolymers are commercially available from The Dow Chemical Company, under the trade name VERSIFY™, or from ExxonMobil Chemical Company, under the trade name VISTAMAXX™.

In one embodiment, the propylene-α-olefin interpolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, specifically an average of at least 0.005 and more specifically an average of at least 0.01, long chain branches/1000 total carbons. The maximum number of long chain branches in the propylene-α-olefin copolymer is not critical, but typically it does not exceed 3 long chain branches/1000 total carbons. The term long chain branch, as used herein with regard to propylene-α-olefin copolymers, refers to a chain length of at least one (1) carbon more than a short chain branch, and short chain branch, as used herein with regard to propylene-α-olefin copolymers, refers to a chain length of two (2) carbons less than the number of carbons in the comonomer. For example, a propylene-1-octene interpolymer has backbones with long chain branches of at least seven (7) carbons in length, but these backbones also have short chain branches of only six (6) carbons in length. Such propylene/alpha-olefin copolymers are further described in details in the U.S. Patent Publication No. 2010-0285253 and International Patent Publication No. WO 2009/067337, then entire contents of which are hereby incorporated by reference.

The polyolefin elastomers detailed above may be carboxylated using a variety of different monomers. Examples of monomers used to carboxylate the polyolefin elastomer include unsaturated carboxylic esters, unsaturated carboxylic acids, unsaturated carboxylic anhydrides, vinyl monomers, and acrylic monomers. In one embodiment, such monomers include maleic anhydride, citraconic anhydride, itaconic anhydride, glutaconic anhydride, 2,3-dimethylmaleic anhydride, maleic acid, fumaric acid, citraconic acid, mesaconic acid, glutaconic acid, acrylic acid, methacrylic acid, crotonic acid, 2-pentenoic acid, 2-methyl-2-pentenoic acid, dimethyl maleate, diethyl maleate, di-n-propyl maleate, diisopropyl maleate, dimethyl fumarate, diethyl fumarate, di-n-propyl fumarate, diisopropyl fumarate, dimethyl itaconate, methyl acrylate, hydroxyethyl acrylate, ethyl acrylate, methyl methacrylate, ethyl methacrylate, methyl crotonate, ethyl crotonate, hydroxyethyl acrylate, hydroxyethyl methacrylate, hydroxypropyl acrylate, hydroxypropyl methacrylate, or the like, or a combination comprising at least one of the foregoing monomers. An exemplary carboxylate monomer for use in the carboxylation of the polyolefin elastomer is maleic anhydride.

The concentration of the carboxylating monomer is 0.1 to 25 weight percent (wt %), specifically 2 to 20 wt %, and more specifically 4 to 18 wt %, based on the weight of polyolefin.

The carboxylate monomers are readily grafted to polyolefins, in a solution or melt phase, using radical initiators such as organic peroxides or azo compounds as initiators. In one embodiment, the monomers are grafted to the polyolefin in a solution process according to the procedure described in U.S. Pat. No. 6,262,182, incorporated herein by reference. Solvents with relatively low boiling points are typically easier to remove and consequently more desirable for use in this process. Exemplary solvents include chlorobenzene (boiling point (b.p.) 132° C.), tert-butylbenzene (b.p. 169° C.), and anisole (b.p. 154° C.). In another embodiment, the monomers are grafted to the polyolefin in an extrusion process according to the procedure described U.S. Pat. No. 6,046,279, incorporated herein by reference.

The carboxylated polyolefins are further reacted with at least one chlorinating agent to generate a carboxylated chlorinated polyolefin. If desired, the carboxylated polyolefin prepared via the solution process described above may be chlorinated in the solvent used to prepare the carboxylated polyolefin. Alternatively, solvent may be removed from the carboxylated polyolefin and replaced with any suitable solvent for the reaction with chlorine. Carboxylated polyolefins prepared via the extrusion process described previously will typically be dissolved in a suitable solvent prior to the chlorination reaction. In one embodiment, the carboxylated polyolefins are chlorinated as described in U.S. Pat. No. 4,954,573, incorporated herein as reference. In another embodiment, the carboxylated polyolefins are chlorinated as described in U.S. Pat. No. 5,436,079, incorporated herein by reference. The chlorine content of the carboxylated chlorinated polyolefin is 0.5 to 50 wt %, specifically 5 wt % to 30 wt %, based on the total weight of the carboxylated chlorinated polyolefin.

In one embodiment, the carboxylated chlorinated polyolefin can be acrylic or polyurethane modified as detailed in EP 1153996 B 1, the entire contents of which are incorporated herein by reference.

The carboxylated chlorinated polyolefin may be present in the primerless paint composition in an amount of 1 to 99 wt %, specifically 2 to 70 wt % and more specifically 5 to 30 wt %, based on the total weight of the primerless paint composition. Commercially available carboxylated chlorinated polyolefins may be obtained as HARDLEN® F-2P, HARDLEN® F-6P, HARDLEN® M-28P from Toyobo Company and SUPERCHLON® 930S, SUPERCHLON® 2319S and SUPERCHLON® 3228S from Nippon Paper Industries Co. Ltd.

As detailed above, the primerless paint composition comprises one or more of a polyacrylic binder or a vinyl aromatic block copolymer binder. The polyacrylic binder is a polymer derived from an acrylate monomer that has a structure represented by formula (1):

where $R_1$ is a hydrogen, hydroxyl or an alkyl group having 1 to 10 carbon atoms. Examples of the first repeat monomer are acrylates and alkyl acrylates such as, for example, hydroxyacrylates, methyl acrylates, ethyl acrylates, propyl acrylates, or the like, or a combination comprising at least one of the foregoing acrylates.

In one embodiment, the acrylate polymer is derived from a monomer having a structure represented by the formula (2):

where $R_1$ is a hydrogen, hydroxyl or an alkyl group having 1 to 10 carbon atoms and $R_2$ is a $C_{1-10}$ alkyl, a $C_{3-10}$ cycloalkyl, or a $C_{7-10}$ aralkyl group. Examples of the (meth) acrylates are methacrylate, ethacrylate, propyl acrylate, methyl methacrylate, methyl ethylacrylate, methyl propylacrylate, ethyl ethylacrylate, methyl arylacrylate, hydroxymethylacrylate, hydroxyethyacrylate, or the like, or a combination comprising at least one of the foregoing acrylates. The term "(meth)acrylate" implies that either an acrylate or methacrylate is contemplated unless otherwise specified.

The acrylate polymer has a number average molecular weight of 3,000 to 1,000,000 grams per mole, specifically 5,000 to 500,000 grams per mole. The polyacrylic binder may be used in amounts of 5 to 95 wt %, specifically 25 to 60 wt %, based on the total weight of the primerless paint composition.

When an acrylate polymer is used in the primerless paint, an optional hardener may be used. The optional hardener can be an isocyanate or a polyisocyanate. The isocyanate or the polyisocyanate can be added to the primerless paint during manufacturing or alternatively, the acrylate polymer may be endcapped with an isocyanate functionality or with a polyisocyanate functionality. An exemplary isocyanate hardener is hexamethylene diisocyanate. The op hardener may be added in amounts of 0.5 to 20 wt %, specifically 1 to 10 wt %, based on the total weight of the primerless paint composition.

The primerless paint composition may also contain a vinyl aromatic block copolymer binder in lieu of the polyacrylic binder or in combination with the polyacrylic binder. The term vinyl aromatic block copolymer means a polymer having at least one block segment of a vinyl aromatic monomer in combination with at least one saturated or unsaturated elastomeric monomer segment, and more preferably not having a block of polymer that is neither elastomeric nor vinyl aromatic. Examples of vinyl aromatic block copolymers are "styrene block copolymer or styrenic block copolymer". The term 'styrene block copolymer" or "styrenic block copolymer" means a polymer having at least one block segment of a styrenic monomer in combination with at least one saturated or unsaturated rubber monomer segment, and more preferably not having a block of polymer that is neither rubber or styrenic. Suitable styrene block copolymers having unsaturated rubber monomer units include styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like. The term "styrene butadiene block copolymer" is used herein inclusive of SB, SBS and higher numbers of blocks of styrene (S) and butadiene (B). Similarly, the term "styrene isoprene block copolymer" is used inclusive of polymers having at least one block of styrene and one of isoprene (I). The structure of the styrene block copolymers can be of the linear or radial type, and of the diblock, triblock or higher block type. In some embodiments the styrenic block copolymers having at least four different blocks or a pair of two repeating blocks, for example, repeating styrene/butadiene or styrene/ethylene propylene blocks, are desirable. Styrene block copolymers are commercially available from Dexco Polymers under the trademark VECTOR®, from KRATON Polymers under the trademark KRATON™, from Chevron Phillips Chemical Co. under the trademark SOLPRENE™ and K-Resin, and from BASF Corp. under the trade designation STYROLUX™. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The elastomer portion of the block copolymer is optionally either unsaturated or saturated. Block copolymers with unsaturated elastomer monomer units may comprise homopolymers of butadiene or isoprene and copolymers of one or both of these two dienes with a minor amount of styrenic monomer. When the monomer employed is butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated elastomer monomer units, more preferably including at least one segment of a styrenic unit and at least one segment of butadiene or isoprene, with SBS and SIS most preferred. Among these, SIS is preferred because it has been found to be particularly effective to compatibilize polypropylene with other polymers in the composition according to the practice of the invention. Furthermore, it is preferred because of a lower tendency to crosslink forming gels during manufacture as compared to SBS. Styrene butadiene block copolymers are alternatively preferred when a cast tenter line is used in manufacturing a film when its higher clarity and lower haze are advantageous.

Elastomeric styrene block copolymers are preferred in the practice of the present invention to provide toughness and lower stiffness than would be obtained in the absence of the block copolymer. Elastomeric behavior is indicated by a property of tensile percent elongation at break of advantageously at least about 200, preferably at least about 220, more preferably at least about 240, most preferably at least about 260 and preferably at most about 2000, more preferably at most about 1700, most preferably at most about 1500 percent as measured by the procedures of ASTM D412 and/or ASTM D882. Industrially, most polymers of this type contain 10-80 wt % styrene. Within a specific type and morphology of polymer, as the styrene content increases the elastomeric nature of the block copolymer decreases.

The block copolymers desirably have a melt flow rate (MFR) of at least about 2, preferably at least about 4 grams per 10 minutes (g/10 min) and desirably at most 20 g/10 min, preferably at most 30 g/10 min. Measure MFR according to ASTM method D1238 Condition G.

Preferred styrenic block copolymers include styrene-isoprene-styrene block copolymers ("SIS"), styrene-butadiene-styrene block copolymers ("SBS"), styrene-ethylene-propylene block copolymers ("SEP"), and hydrogenated styrenic block copolymer such as styrene-(ethylene butylene)-styrene block copolymers ("SEBS") (e.g., the SEBS commercially available from Kraton Polymers LLC under the trade designation KRATON™ 1657). Preferably, the styrenic block copolymer used in the primerless paint is SBS.

The styrene block copolymers also are preferably sufficiently impact resistant to add durability in paint applications. Notched Izod Impact resistance is measured according to the procedures of ASTM D256 and preferably gives a no break condition when tested at 72° F. or 23° C.

In one embodiment, the styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This feature facilitates control of polybutadiene segment thickness, to obtain improved clarity. For high clarity, the polybutadiene segment thickness is preferably about one-tenth of the wavelength of visible spectrum or less.

The vinyl aromatic block copolymer binder may be used in amounts of 5 to 95 wt %, specifically 25 to 60 wt %, based on the total weight of the primerless paint composition.

In one embodiment, the polyacrylic binder and the vinyl aromatic block copolymer binder may both be simultaneously used in the primerless paint composition. When the polyacrylic binder and the vinyl aromatic block copolymer binder are used simultaneously in the primerless paint composition, the weight ratio of the polyacrylic binder to the vinyl aromatic block copolymer binder may vary in an amount of 1:9 to 9:1.

The polyvinylchloride binder comprises polyvinylchloride. In an embodiment, the polyvinylchloride binder includes a blend of polyvinylchloride with other polymers such as polyvinylacetates, polyacrylates, polymethylmethacrylates, and the like. The vinyl chloride polymer included in the polymer blends may be rigid or essentially rigid vinyl chloride polymer such as vinyl chloride homopolymers and interpolymers of vinyl chloride with interpolymerizable monomers such as vinyl esters of organic acids containing 1 to 18 carbon atoms, e.g., vinyl acetate, vinyl stearate, and so forth; vinylidene chloride; symmetrical dichloroethylene; acrylonitrile; methacrylonitrile; alkyl acrylate esters in which the alkyl group contains 1 to 8 carbon atoms, e.g., methyl acrylate and butyl acrylate; the corresponding alkyl methacrylate esters; dialkyl esters of dibasic organic acids in which the alkyl groups contain 1 to 8 carbon atoms, e.g., dibutyl fumarate, diethyl maleate, and so forth. In general, where vinyl chloride interpolymers are employed, they should contain at least about 80 weight percent of vinyl chloride.

The polyvinylchloride binder may be used in amounts of 5 to 95 wt %, specifically 25 to 60 wt %, based on the total weight of the primerless paint composition.

The primerless paint composition also comprises dyes and pigments. The dyes may be organic dyes and pigments or inorganic dyes and pigments. Examples of suitable organic dyes and pigments that can be used are anthranones and their derivatives; anthraquinones and their derivatives; croconines and their derivatives; monoazos, disazos, trisazos and their derivatives; benzimidazolones and their derivatives; diketo pyrrole pyrroles and their derivatives; dioxazines and their derivatives; diarylides and their derivatives; indanthrones and their derivatives; isoindolines and their derivatives; isoindolinones and their derivatives; naphtols and their derivatives; perinones and their derivatives; perylenes and their derivatives such as perylenic acid anhydride or perylenic acid imide; ansanthrones and their derivative; dibenzpyrenequinones and their derivatives; pyranthrones and their derivatives; bioranthorones and their derivatives; isobioranthorone and their derivatives; diphenylmethane, and triphenylmethane, type pigments; cyanine and azomethine type pigments; indigoid type pigments; bisbenzoimidazole type pigments; azulenium salts; pyrylium salts; thiapyrylium salts; benzopyrylium salts; phthalocyanines and their derivatives, pryanthrones and their derivatives; quinacidones and their derivatives; quinophthalones and their derivatives; squaraines and their derivatives; squarilylums and their derivatives; leuco dyes and their derivatives, deuterated leuco dyes and their derivatives; leuco-azine dyes; acridines; di- and tri-arylmethane, dyes; quinoneamines; o-nitro-substituted arylidene dyes, aryl nitrone dyes, or the like, or a combination comprising at least one of the foregoing organic dyes and pigments.

Examples of inorganic dyes and pigments include aluminum pigment (e.g., ultramarine violet (PV15) which is a silicate of sodium and aluminum containing sulfur; ultramarine (PB29) which is a complex naturally occurring pigment of sulfur-containing sodio-silicate (Na8-10Al6Si6O$_2$4 S$_2$-4)), copper pigment (e.g., Han purple having BaCuSi$_2$O$_6$; Egyptian blue; Han blue, which is BaCuSi$_4$O$_{10}$), cobalt pigments (e.g., cobalt violet (PV14) which is a cobalt phosphate; cobalt blue (PB28); and cerulean blue (PB35), which is a cobalt(II) stannate), manganese pigments (e.g., manganese violet (PV16), which is a manganese ammonium phosphate), iron pigments, cadmium pigments, chromium pigments, arsenic pigments, lead pigments, titanium pigments, antimony pigments, or the like, or a combination comprising at least one of the foregoing inorganic pigments.

Basic dyes, fat-soluble dyes, metal-complex dyes, organic pigments, inorganic pigments and metallic pigments can be used in the primerless paint composition. Basic dyes are cationic dyes that are highly soluble in polar solvents such as alcohols, glycols and water. They are used by the printing ink industry with laking agents such as tannic acid to produce clean, bright shades. Fat-soluble dyes include nonionic, metal-free azo and anthraquinone dyes, which are highly soluble in less polar solvents, such as aromatic and aliphatic hydrocarbons. Azo dyes are mainly used for aliphatic/aromatic solvent-based woodstains and in the coloration of styrene polymers. Anthraquinone dyes are used much more widely in the coloration of plastics and fibers on account of their much wider range of resistance properties. Metal-complex dyes are mainly anionic chromium and cobalt complexes of azo dyes. The cation is either a sodium ion or a substituted ammonium ion. Substituted soluble phthalocyanines also fall into this category. These dyes are normally soluble in alcohols, glycolethers, ketones and esters. Organic pigments are chemically synthesized; they contain carbon and come with relatively low levels of toxicity, not providing any major environmental concern. Organic pigments are generally categorized into six types: diazo pigments, monoazo pigments, acid and base dye pigments, phthalocyanine pigments, quinacridone pigments, or a combination thereof.

Inorganic pigments are created through chemical manufacturing rather than by grinding and washing clays or minerals taken directly from the earth. Examples of inorganic pigments are $TiO_2$, carbon black, iron oxide, antimony oxide, zinc oxide, calcium carbonate, fumed silica, lead oxide, cobalt blue, chromium oxide, cadmium yellow, molybdate orange, and nickel titanate. In other pigments, such as fluorescent and phosphorescent dyes and pigments that can provide special effects are produced.

The organic dyes and pigments and the inorganic dyes and pigments may both be added to the primerless paint composition if desired. The primerless paint composition comprises the dye or the pigment in an amount of 1 to 10 wt %, specifically 2 to 9 wt %, and more specifically in an amount of 5 to 8 wt %, based on the total weight of the primerless paint composition.

The primerless paint composition also comprises a liquid carrier. In an embodiment, the primerless paint composition may comprise an organic solvent. The organic solvent may be a liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations comprising at least one of the foregoing aprotic polar solvents. Polar protic solvents such as water, methanol, acetonitrile, nitromethane, ethanol, propanol, isopropanol, butanol, butyl acetate or the like, or combinations comprising at least one of the foregoing polar protic solvents may be used. Other non-polar solvents such a benzene, toluene, methylene chloride, carbon tetrachloride, hexane, diethyl ether, tetrahydrofuran, cyclohexanone, or the like, or combinations comprising at least one of the foregoing solvents may also be used. Co-solvents comprising at least one aprotic polar solvent and at least one non-polar solvent may also be utilized to modify the viscosity and the adhesion characteristics of the paint.

The solvent may be used in amounts of 15 to 80 wt %, specifically 17 to 78 wt %, and more specifically 20 to 75 wt %, based on the total weight of the primerless paint composition.

In one method of manufacturing the primerless paint composition, the carboxylated chlorinated polyolefin, the polyacrylic binder/and or the aromatic block copolymer, the dyes and/or pigments and the solvent may be blended to form the primerless paint composition prior to application as a coating on a substrate. The blending may be conducted in a mixing device that applies shear, extensional and/or elongational forces to the mixture to form the primerless paint composition.

The mixing may be conducted in an extruder (single screw or twin screw), a Henschel mixer, a Waring blender, a Buss Kneader, a Banbury, a roll mill (two or more rolls), high shear impeller disperser, dough mixer, or the like. The primerless paint composition may then be applied to a substrate by brush painting, spray painting, electrostatic spray painting, dip coating, using a doctor blade, or the like, or a combination comprising at least one of the foregoing methods of painting. The substrate with the primerless paint composition disposed thereon may be subjected to drying at a temperature of 15° C. to 100° C., specifically 25° C. to 80° C., and more specifically 50° C. to 75° C. for a time period of 30 seconds to 4 hours, specifically 5 minutes to 2 hours, and more specifically 10 minutes to 1 hour.

In one embodiment, the paint may be sold as a single component system. In other words, all of the ingredients listed above may be mixed to form the primerless paint composition and then sold to customers in a single can.

In another embodiment, the primerless paint composition may be sold as a two part or two component composition. In this event, the carboxylated chlorinated polyolefin forms a first component that is transported and stored separately from the polyacrylic binder and/or the vinyl aromatic copolymer that forms the second component. The solvent and/or the pigment may be evenly distributed between the first component and the second component. Alternatively, the solvent may be divided between the first component and the second component, while the dye or pigment is a part of either the first component or the second component.

Preassembly and premix, product finishing and packaging are some of the steps used in manufacturing the primerless paint pigment. In one embodiment, in one method of manufacturing the primerless paint composition, liquid raw materials are assembled in the preassembly and premix step and then mixed in containers to form a viscous material to which pigments are added (e.g., resins, organic solvents, plasticizers, dry pigment, and pigment extenders). Pigment milling, which is a part of the product finishing step may also be conducted—this entails the incorporation of the pigment into the liquid base of the coating (e.g., resins, organic solvents and plasticizers) to yield a fine particle dispersion. The three stages of this process include wetting, grinding, and dispersion, which may overlap in any grinding operation. Final product specifications for color, viscosity, and other coating characteristics are achieved in the product finishing step. This process generally consists of thinning, tinting, and blending. Most of the solvents, tints, and shades are added during this operation. The product is then packaged.

The primerless paint composition may be advantageously used to paint polyolefin substrates, especially substrates that comprise thermoplastic polyolefins such as polyethylene, polypropylene, polyethylene-polypropylene copolymers, and the like. The primerless paint composition can be directly applied onto the flexible polyolefin elastomer substrates without any surface pretreatment, and achieve excellent adhesion, abrasion resistance and flexibility. The substrates can also include commercially available polyolefin polymers and blends of commercially available polyolefin polymers such as an ENGAGE™-polypropylene blend, AFFINITY™-polypropylene blend, INFUSE™/VERSIFY™ blend, ENGAGE™/VERSIFY™ blend and VERSIFY™.

The compositions detailed herein are further exemplified in the following non-limiting examples.

EXAMPLE

This example was conducted to demonstrate the method of manufacturing the primerless paint composition and using the primerless paint composition on a polyolefin substrate. The substrates used are shown in the Table 1 below. Hardness is listed as Shore A (A), Shore D (D), or Rockwell (R).

TABLE 1

| Product | Producer | Type | Density, g/cc | MFR, dg/min | Hardness Shore A | Tg ° C. | Tm, ° C. | Vicat Softening Temp, ° C. |
|---|---|---|---|---|---|---|---|---|
| INFUSE ™ 9500 | Dow | OBC | 0.877 | 5$^a$ | 69 (A) | −62 | 122 | — |
| PP 9712 | Total | icPP | 0.905 | 25$^b$ | 80 (R) | — | 165 | 135 |

$^a$Measured at 190° C., 2.16 kg
$^b$Measured at 230° C., 2.16 kg

The substrates were prepared by extruding the INFUSE 9500 and the PP9712 in a 65:35 weight ratio and pelletizing it as follows. Compounding was performed on a Coperion ZSK 18 co-rotating intermeshing twin screw extruder, having a barrel diameter D=18 mm with a length to diameter ratio L/D=48. The extruder has 8 temperature control zones (barrels) and is equipped with a two-hole 2 mm die, 2 m long cooling water bath and air knife. Compounding was performed with the temperature profile set at 100/150/180/180/200/200/200/180° C. The feeding rate was 10 kilograms per hour (kg/hr), screw revolutions per minute (RPM) was 800, and torque was approximately 40%.

The extruded samples were then molded into plaques. The plaque samples were molded using a Fanuc Roboshot S-2000 I 100BH, 100 ton injection molding machine equipped with a plaque mold. The barrel temperature profile was set at 50/170/200/200/200/200° C. The mold temperature was 30° C. The injection speed was 30 millimeter per second (mm/s). Molded plaques were held at 40 MPa for 20 seconds (s) and then cooled for an additional 16 seconds.

The plaques were used as substrates on which was disposed the primerless paint coating. The surface of the substrates was cleaned using methyl ethyl ketone before painting, to avoid the negative effect of greasy or dirty areas of the substrate to the adhesion resistance.

The primerless paint coating was disposed on the substrate using spray painting with an air spray gun. A gravity feed air spray gun (ANEST IWATA, model: W-101-134G) was used to paint sample plaques. The spray gun has a 1.3 millimeter (mm) diameter nozzle, fluid output of 140 milliliter per minute (mL/min), spray pattern width of 205 mm, and uses an atomizing pressure of 28.0 pounds per square inch (psi) (1.96 kilogram-force per square centimeter (kgf/cm$^2$)). Spray painting was done inside a coating booth located in SDC IF heavy-lab. The coating weight was estimated to be 10 to 50 micrometer thickness after drying.

Samples painted with Peter-Lacke acrylic paint were baked for 30 minutes at 80° C. in Thermo Scientific Lindberg. The vacuum ovens are connected to an in-house vacuum source. All other paints were dried under room temperature for 30 minutes.

Commercial paint compositions were purchased and used for making the primerless paint compositions. The method of manufacturing the primerless paint compositions and the compositions will be discussed in detail below. The commercial paint compositions are shown in the Table 2 below.

TABLE 2

| Sample description | Commercially available from |
|---|---|
| PVC Paint Thinner- T510: Mixture of cyclohexanone, methylal, xylene, and sec-butyl acetate. | Hang Cheung Coatings Ltd |
| PVC Paint - 5300 Series: Base resin is a blend of acrylic acid polymers, vinyl chloride-vinyl acetate copolymer, and alkyd resin, dissolved in a solvent combination of xylene, methyl ethyl ketone, cyclohexanone, diacetone alcohol, acetone, sec-butyl acetate, and n-propanol. Pigment is also added. The solids content is 40 wt %. | |
| SBS Paint Thinner- T593: Mixture of cyclohexanone and methyl ethyl ketone | Hang Cheung Coatings Ltd |
| 5900 Series SBS Paint: Base resin is a blend of SBS (styrene-butadiene-styrene) polymer based paint and carbon hydrogen resin, dissolved in a mixture of butyl acetate and isoparaffin. Pigment is also added. The solids content is 50 wt %. | |
| 6100 Series Polyurethane (PU) Top Paint: PU based paint, modified silicon, cyclohexanone, and pigment. | |
| PEHAFIX Thinner No. 4 (Article number: VPCH02008): Mixture of acetone, 2-butoxyethanol, and heptane | Peter-Lacke |
| PEHACRYL-PM 2C Metallic Varnish (Article number: VPCH07875): Reactive acrylic-type paint, possibly including carbon black as pigment, dissolved in toluene, n-butyl acetate and butanol, 2-methoxy-1-methylethyl acetate, and naphtha. The solids content is 35 wt %. | |
| PEHAPOL-L Hardener (Article number: P85057): Hexamethylene-1,6-diisocyanate homopolymer dissolved in a mixture of n-butyl acetate, 2-methoxy-1-methylethyl acetate, and hexamethylene-di-isocyanate. | |
| Acrylic/CPP paint package This is a commercially available one-step painting system, designed for polypropylene. The base resin is the blend of modified chlorinated (is this the correct word? Please let me know.) polypropylene (CPP) and acrylic resins, dissolved in a solvent mixture of xylene, trimethylbenzene, and cyclohexanone. This one-step painting system should have good adhesion resistance to polyolefin elastomer based substrates due to the incorporation of CPP resin. The solid content is 69 wt %. | Hamstar Ltd |
| HARDLEN ® F-2P (Primer) is a polyolefin resin grafted with chlorine (20%) and maleic anhydride (1.6%), which has good adhesion power to polyolefin substrates without any surface treatment. The molecular weight is 75,000, and melting temperature is 72° C. | Toyobo Co. |

TABLE 3

| | Solid component ratio HARDLEN ® F-2P:Paint | | |
|---|---|---|---|
| Inventive primerless paints | 0.5 F-2P | 1.0 F-2P | 2.0 F-2P |
| Inventive SBS primerless paint | 1:2 | 1:1 | 2:1 |
| Inventive acrylic primerless paint | 1:2 | 1:1 | 2:1 |

The paint was applied to the substrates as detailed below.

A one-step painting process indicates applying the paint on the substrates directly, with no primer before applying paint. A two-step painting process indicates that the primer is applied before applying the paint, in order to improve the adhesion strength of the paint to the substrate. The primer used in two-step painting process is the solution of 5 wt % HARDLEN® F-2P in xylene. The HARDLEN® F-2P contains the carboxylated chlorinated polyolefin elastomer. The primer was dried at 23° C. for 30 minutes before applying the paint. The proposed inventive primerless paint also using one-step painting process is the blend of HARDLEN® F-2P and paint. Two paints were used: SBS paint (Hang Cheung), and Acrylic paint (Peter Lacke). HARDLEN® F-2P was first dissolved in xylene to make a 20 wt % HARDLEN® F-2P solution, and then HARDLEN® F-2P solution was blended with the respective paint at a ratio of the solid component content of HARDLEN® F-2P and the paint. For each paint, three different solid component ratios between HARDLEN® F-2P and paint were evaluated, namely, 1:2, 1:1, and 2:1 (See Table 3 below). The different methods of painting the substrates are also shown in the FIG. 1. FIG. 1 contains a process map of the methods in which the various substrates were painted.

The coated substrates were then subjected to testing to evaluate each of the samples. The tests are detailed below.

Abrasion Resistance Test (Eraser Test)

Figure 2:
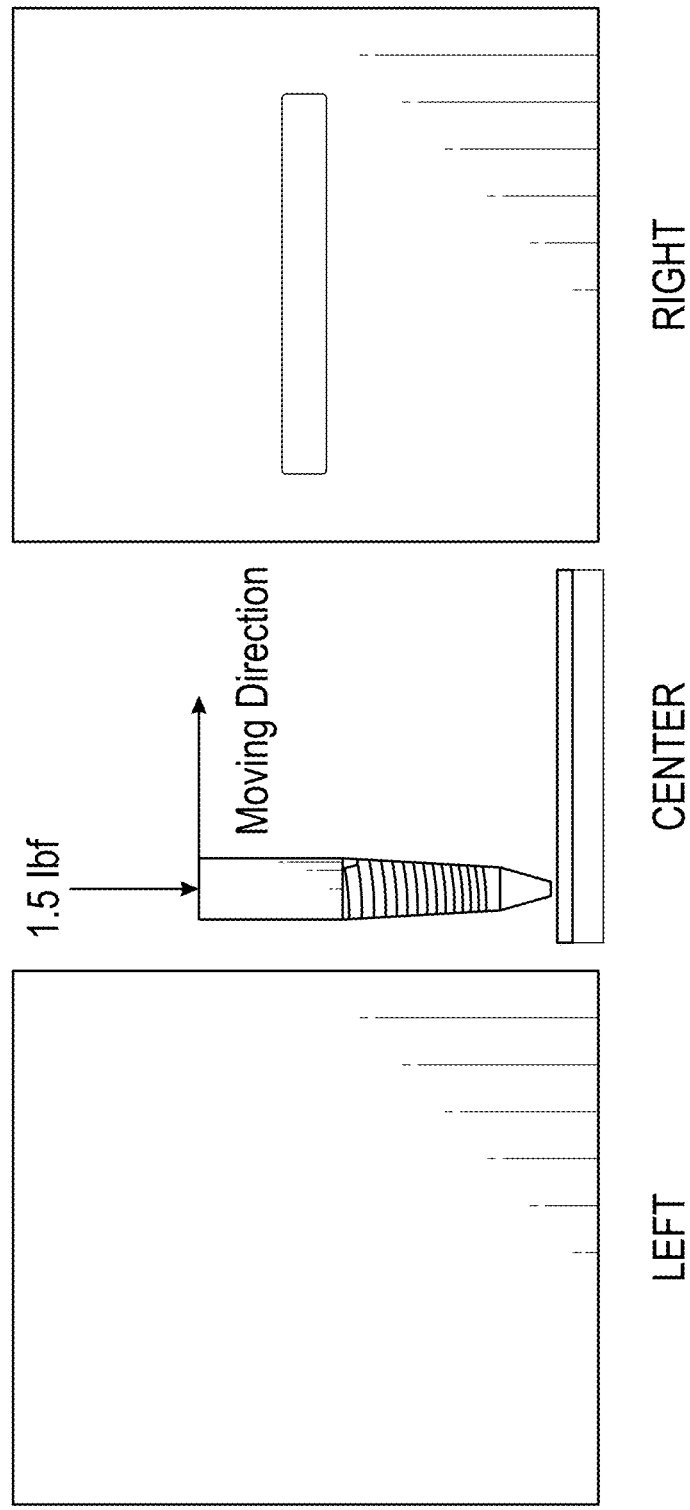
FIG. 2 depicts the eraser test method schematic.

The eraser test was designed to determine the abrasion resistance of the surface coating. The test was done with the following procedure and is depicted in FIG. 2. Hold the eraser (Blaisdell #536-T Eraser/Sanford Magi Rub 1960 Peel off Eraser) perpendicular to the surface coating test area and apply a downward force of 7 N (1.5 lbf). Stroke or erase along a suitable test path length (~3 cm) in one direction. Examine the damage of the coating (or record how many strokes, up to 10 strokes, are conducted to damage the surface). FIG. 2 depicts the eraser test method schematic. The illustration on the left is painted plaque. The center illustration shows the rubber test and the illustration on the right shows the painted surface with the damage.

Adhesion Strength Test (Cross-Hatch Test)

Cross-hatch testing is a well-established test method to determine the adhesion strength of a coating to a substrate. The following test procedure was used, as depicted in FIG. 3 (A) through 3 (E).

Figure 4:
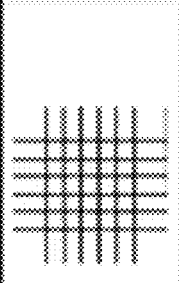
FIG. 4 depicts the adhesion test result ranking criteria by ISO 2409/ASTM D3359 Method B.

Use the cross-hatch scribe to make 9 straight parallel cuts, 2 mm apart, through the surface coating. Then make 11 similar cuts perpendicular to the first set of cuts. Apply tape (3M #810) to the scribed area and rub with fingers to provide adequate contact pressure. Grasp the loose end of the tape and pull smoothly and quickly at an angle of 135 degrees to the surface to remove the tape from the surface. Examine the surface for any evidence of paint removal. FIG. 3 shows the cross-hatch testing schematic. FIG. 3 (A) depicts a surface of the painted plaque. FIG. 3 (B) shows the painted surface with scribed squares. FIG. 3 (C) shows applying tape to surface with the scribed squares. FIG. 3 (D) depicts removal of tape from surface, while FIG. 3 (E) depicts an examination of the surface to determine the percentage of squares with paint removed. According to ISO 2409 or ASTM D3359 Method B, the paint adhesion can be graded using the scales depicted in FIG. 4. FIG. 4 depicts the adhesion test result ranking criteria by ISO 2409/ASTM D3359 Method B. In this report, the ASTM D3359 ranking system was used.

Flexibility Test

The painted substrate was blended to 360 degrees, and if no crack was observed, this was taken as an indication that the paint had good flexibility. If not, the paint had poor flexibility. This test is useful evaluating paint adhesion to polyolefin elastomer based flexible substrates.

The test results are detailed below. As noted above, injection molded plaques of INFUSE™ 9500/PP 9712 (65/35 wt/wt) blend were used as substrates in this study. Shore A of INFUSE™ 9500/PP 9712 (65/35 wt/wt) blend is 86. The performance and cost of comparative paint systems and inventive paint systems are given in Table 4 below.

To improve the adhesion of the paint to the substrate, HARDLEN® F-2P was applied between substrate and paint as the primer. HARDLEN® F-2P is a polyolefin resin which should have good compatibility to polyolefin elastomer based substrate. Specifically HARDLEN® F-2P is carboxylated chlorinated polyolefin grafted with maleic anhydride and treated with chlorine, and these functional groups should be compatible to both polyolefin elastomer substrate and the paints.

Figure 7:
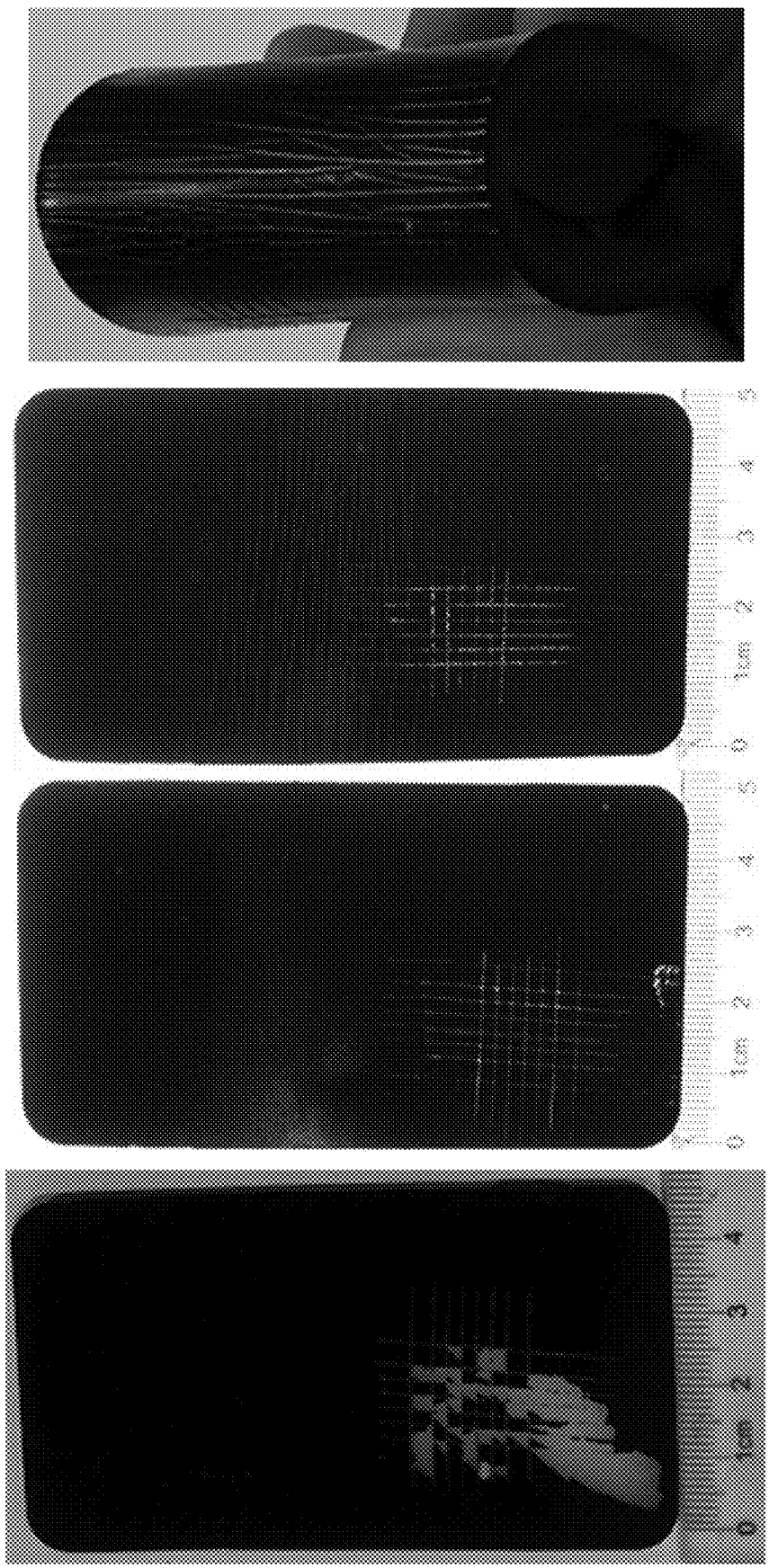
FIG. 7 shows photographs of comparative primer and paint using a two-step procedure (PVC paint, SBS paint, acrylic paint)

HARDLEN™ F-2P was dissolved in xylene to make a 5 wt % HARDLEN® F-2P solution, then spray painting HARDLEN® F-2P solution on to the substrate and followed by spray painting PVC paint, SBS paint and acrylic paint, respectively. Significant improvement of the adhesion of SBS paint and acrylic paint to the substrate, with the assistance of HARDLEN® F-2P, was observed, while PVC paint did not, probably due to poor adhesion between HARDLEN® F-2P and PVC paint. All three paints showed good abrasion resistance and flexibility, except acrylic paint, which is still very brittle when bending (See FIG. 7). The labor cost would be high since two steps of painting process were required.

The samples and the results shown in the Table 3 may be summarized as follows. Two commercialized paints were used: SBS paint (Hangcheung), and Acrylic paint (Peter-Lacke). For each paint, three different solid component ratios between HARDLEN® F-2P and paint were evaluated—1:2, 1:1, 2:1. The results showed that inventive SBS

TABLE 4

| Paint system | Painting procedure | | Performance & cost | | | |
| --- | --- | --- | --- | --- | --- | --- |
| | Primer | Paint | Adhesion | Abrasion | Flexibility | Labor cost |
| Comparative primerless paint | | PVC paint | 0 | >10 | Good | Low |
| | | SBS paint | 0 | >10 | Good | Low |
| | | Acrylic paint | 0 | >10 | Poor | Low |
| | | Acrylic/CPP paint | 5B | >10 | Poor | Low |
| Comparative primer & paint | HARDLEN ® F-2P | PVC paint | 0 | >10 | Good | High |
| | HARDLEN ® F-2P | SBS paint | 5B | >10 | Good | High |
| | HARDLEN ® F-2P | Acrylic paint | 5B | >10 | Poor | High |
| Inventive primerless paint | | SBS primerless paint (0.5 F-2P) | 5B | >10 | Good | Low |
| | | SBS primerless paint (1.0 F-2P) | 5B | >10 | Good | Low |
| | | SBS primerless paint (2.0 F-2P) | 5B | >10 | Good | Low |
| | | Acrylic primerless paint (0.5 F-2P) | 5B | >10 | Good | Low |
| | | Acrylic primerless paint (1.0 F-2P) | 5B | >10 | Good | Low |
| | | Acrylic primerless paint (2.0 F-2P) | 5B | >10 | Good | Low |

Figure 5:
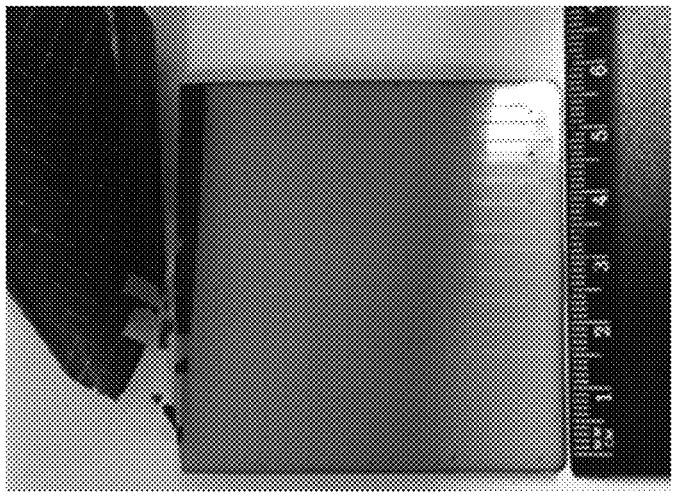
FIG. 5 shows photographs of comparative primerless paint system (PVC paint, SBS paint, acrylic paint)
Figure 5:
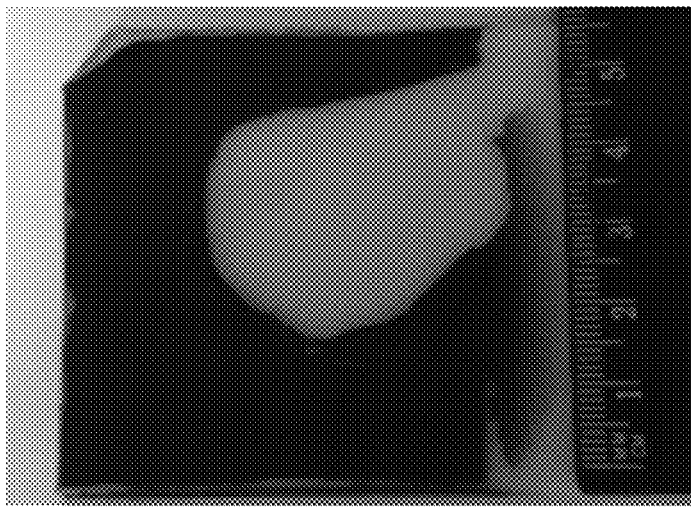
Figure 5:
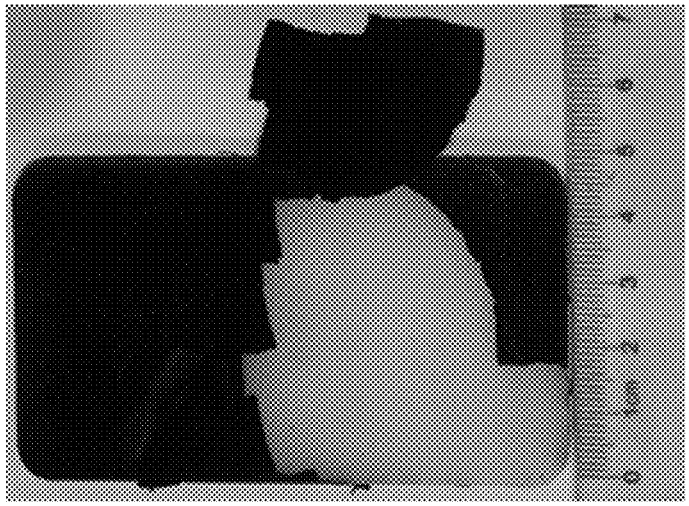

The Table 4 can be summarized as follows. Four different commercialized paints were investigated—PVC paint, SBS paint, acrylic paint, acrylic/CPP paint, and spray painted on the substrate directly. The results showed that PVC paint, SBS paint and acrylic paint had poor adhesion to the substrate (See FIG. 5). This is probably due to the poor interlayer or intermolecular interactions between the paint and the substrate. FIG. 5 shows photographs of comparative primerless paint system (PVC paint, SBS paint, acrylic paint).

Figure 6:
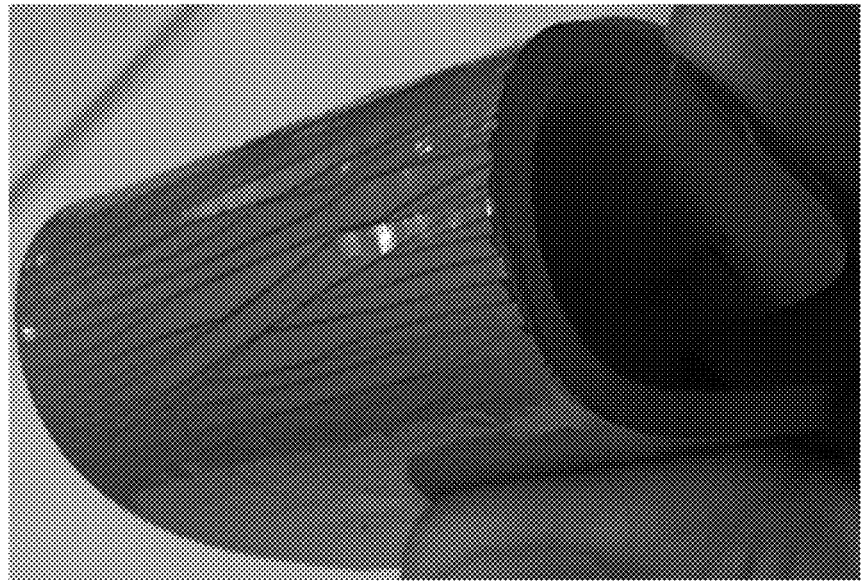
FIG. 6 shows photographs of comparative acrylic/CPP primerless paint.
Figure 6:
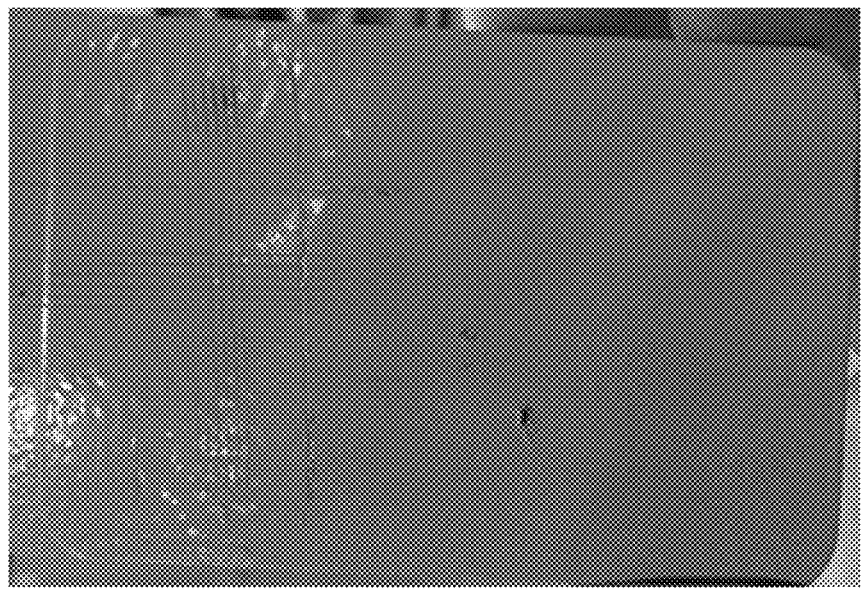
Figure 8:
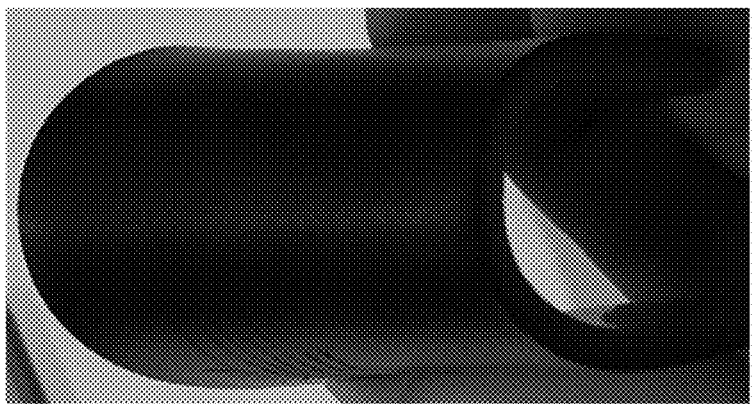
FIG. 8 show photographs of inventive primerless paints (SBS paint, acrylic paint).
Figure 8:
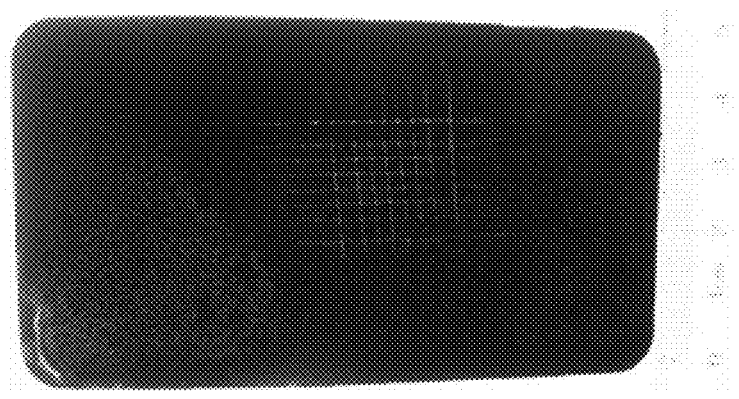
Figure 8:
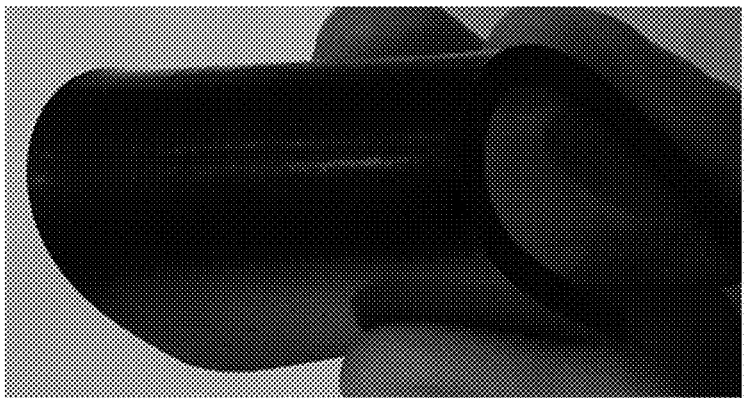
Figure 8:
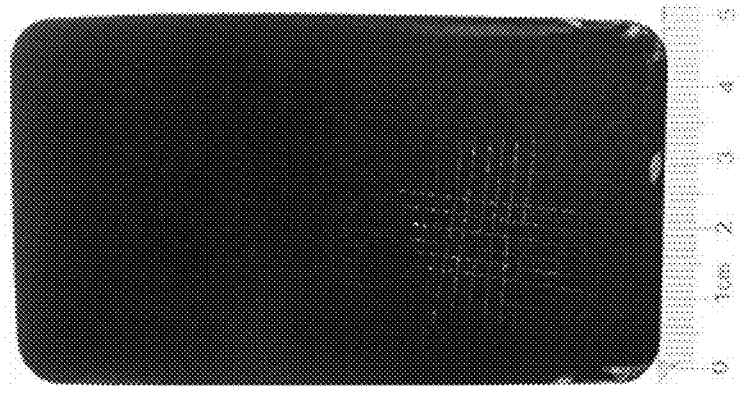

PVC paint and SBS paint showed good abrasion resistance as well as flexibility, and acrylic paint also showed good abrasion resistance but poor flexibility when bending the substrate. Acrylic/CPP paint exhibited good adhesion performance as well as abrasion resistance to the substrate, probably due to the good compatibility between the substrate and CPP incorporated in acrylic/CPP paint, hence inter-diffusion and molecular entanglement occurred between substrate and paint. However, this paint was easy to break when bending since both acrylic and CPP resins are brittle (See FIG. 6). FIG. 6 shows pictures of comparative acrylic/CPP primerless paint.

primerless paint and inventive acrylic primerless paint at different HARDLEN® F-2P contents exhibited:

(a) Excellent adhesion resistance (all rank at 5B according to ASTM D3359): none of the squares of the lattice detached (See FIG. 8) (b) Excellent abrasion resistance: up to 10 strokes are required to damage the surface. (c) Excellent flexibility: no crack observed when bending the plaques and (d) Low labor cost since only one step of painting process is needed.

Example 2

This example was conducted to demonstrate the use of carboxylated chlorinated polyolefin and a styrene-butadiene-styrene binder in a single primerless paint composition. The substrates chosen for testing the primerless paint composition are ENGAGE™-polypropylene blend, AFFINITY™-polypropylene blend, INFUSE™/VERSIFY™ blend, ENGAGE™/VERSIFY™ blend and VERSIFY™. Table 5 details some of the aforementioned materials and their properties.

TABLE 5

| Product | Producer | Type | Density g/cc | MFR dg/min | Hardness Shore A | Tg °C. | Tm °C. | Vicat Softening temp. °C. |
|---|---|---|---|---|---|---|---|---|
| VERSIFY ™ 3401 | Dow | OBC | 0.865 | 8 | 72 | −29.8 | 55 | 42 |
| ENGAGE ™ 8200 | Dow | POE | 0.870 | 5 | 66 | −53 | 59 | |
| AFFINITY ™ 1450G1 | Dow | POE | 0.902 | 7.5 | | | 99 | 79 |

Additional substrate details are provided in the Table 6 below.

TABLE 6

| Elastomer type | Elastomer wt % | PP 9712 wt % | VERSIFY ™ 3401 wt % |
|---|---|---|---|
| INFUSE ™ 9500 | 70 | 30 | |
| ENGAGE ™ 8200 | 70 | 30 | |
| AFFINITY ™ 1450G1 | 70 | 30 | |
| INFUSE ™ 9500 | 70 | | 30 |
| ENGAGE ™ 8200 | 70 | | 30 |
| VERSIFY ™ 3401 | | | 100 |

The painting process involved cleaning the substrate, disposing the primerless paint composition on the substrate and then drying the paint.

In a first set of tests, a primerless paint composition comprising carboxylated chlorinated polyolefin and a styrene butadiene-styrene binder are disposed on some of the substrates. The carboxylated chlorinated polyolefin was Hardlen® F-2P, which was first dissolved in xylene to make a 20 wt % HARDLEN® F-2P solution, and then HARDLEN® F-2P solution was blended with the SBS paint at a weight ratio of the solid component content of HARDLEN® F-2P:SBS paint with 1:2. Then, the HARDLEN® F-2P and SBS paint mixture was diluted using thinner T593 to a suitable viscosity. The paint composition (without the Hardlen® F-2P) is detailed in the Table 7 and the substrates along with test results are shown in Table 8 below.

TABLE 7

| Sample description | Commercially available from |
|---|---|
| SBS Paint Thinner- T593: Mixture of cyclohexanone and methyl ethyl ketone | Hang Cheung Coatings Ltd |
| 5900 Series SBS Paint: Base resin is a blend of SBS (styrene-butadiene-styrene) polymer based paint and carbon hydrogen resin, dissolved in a mixture of butyl acetate and isoparaffin. Pigment is also added. The solids content is 50 wt %. | |

TABLE 8

| Elastomer type | Elastomer wt % | PP 9712 wt % | VERSIFY ™ 3401 wt % | Adhesion | Abrasion | Flexibility |
|---|---|---|---|---|---|---|
| INFUSE ™ 9500 | 70 | 30 | | 5B | Good | Good |
| ENGAGE ™ 8200 | 70 | 30 | | 5B | Good | Good |
| AFFINITY ™ 1450G1 | 70 | 30 | | 5B | Good | Good |
| INFUSE ™ 9500 | 70 | | 30 | 5B | Good | Good |
| ENGAGE ™ 8200 | 70 | | 30 | 5B | Good | Good |
| VERSIFY ™ 3401 | | | 100 | 5B | Good | Good |

The results show that good adhesion, good abrasion and flexibility was obtained. The testing was conducted according to the details provided in Example 1.

Example 3

In this example, a primerless paint composition comprising carboxylated chlorinated polyolefin (HARDLEN® F-2P) and a polyvinylchloride-vinyl acetate binder was used to paint a polyolefin elastomer substrate. The other elements of the paint composition are shown in the Table 9 below.

TABLE 9

| Sample description | Commercially available from |
|---|---|
| PVC Paint Thinner- T510: Mixture of cyclohexanone, methylal, xylene, and sec-butyl acetate. | Hang Cheung Coatings Ltd |
| PVC Paint - 5300 Series: Base resin is a blend of acrylic acid polymers, vinyl chloride-vinyl acetate copolymer, and alkyd resin, dissolved in a solvent combination of xylene, methyl ethyl ketone, cyclohexanone, diacetone alcohol, acetone, sec-butyl acetate, and n-propanol. Pigment is also added. The solids content is 40 wt %. | |

The primerless paint composition comprising carboxylated chlorinated polyolefin and a vinyl chloride-vinyl acetate copolymer binder are disposed on some of the substrates mentioned above. The carboxylated chlorinated polyolefin is Hardlen® F-2P, which was first dissolved in xylene to make a 20 wt % HARDLEN® F-2P solution, and then HARDLEN® F-2P solution was blended with the PVC paint at a weight ratio of the solid component content of HARDLEN® F-2P:PVC paint with 1:2. Then, the HARDLEN® F-2P and PVC paint mixture was diluted using thinner T510 to a suitable viscosity. The paint composition (without the Hardlen® F-2P) is detailed in the Table 9 (above) and the substrates along with test results are shown in Table 10 below.

TABLE 10

| Elastomer type | Elastomer wt % | PP 9712 wt % | VERSIFY™ 3401 wt % | Adhesion | Abrasion | Flexibility |
|---|---|---|---|---|---|---|
| INFUSE ™ 9500 | 70 | 30 | | 5B | Good | Good |
| ENGAGE ™ 8200 | 70 | 30 | | 5B | Good | Good |
| AFFINITY ™ 1450G1 | 70 | 30 | | 5B | Good | Good |
| INFUSE ™ 9500 | 70 | | 30 | 5B | Good | Good |
| ENGAGE ™ 8200 | 70 | | 30 | 5B | Good | Good |
| VERSIFY ™ 3401 | | | 100 | 5B | Good | Good |

The results show that good adhesion, good abrasion and flexibility was obtained. The testing was conducted according to the details provided in Example 1.

Example 4

In this example, a primerless paint composition comprising carboxylated chlorinated polyolefin (HARDLEN® F-2P) and a polyvinylchloride-vinyl acetate binder was used to paint a polyolefin elastomer substrate. The other elements of the paint composition are shown in the Table 11 below.

TABLE 11

| Sample description | Commercially available from |
|---|---|
| PVC Paint Thinner-T305: Mixture of cyclohexanone, methyl ethyl ketone, acetone, ethyl acetate and aliphatic hydrocarbon | Zhongshan Yonghui Chemical Co. Ltd. |
| PVC Paint-ACM series: Base resin is a blend of vinyl chloride-vinyl acetate copolymer and polyvinyl chloride resins, dissolved in a mixture of cyclohexanone. Talc is added. And pigment is also added. The solids content is 50 wt %. | |

The primerless paint composition comprising carboxylated chlorinated polyolefin and a vinyl chloride-vinyl acetate copolymer binder are disposed on some of the substrates mentioned above. The carboxylated chlorinated polyolefin is Hardlen® F-2P, which was first dissolved in xylene to make a 20 wt % HARDLEN® F-2P solution, and then HARDLEN® F-2P solution was blended with the PVC paint at a weight ratio of the solid component content of HARDLEN® F-2P:PVC paint with 1:2. Then, the HARDLEN® F-2P and PVC paint mixture was diluted using thinner T305 to a suitable viscosity. The paint composition (without the Hardlen® F-2P) is detailed in the Table 11 (above) and the substrates along with test results are shown in Table 12 below.

The results show that good adhesion, good abrasion and flexibility was obtained. The testing was conducted according to the details provided in Example 1.

The test results show that a primerless paint composition can achieve excellent adhesion, abrasion resistance and flexibility on flexible polyolefin elastomer substrates without any surface pretreatment. There is no need for using a paint primer, which reduces costs. The inventive primerless paint system comprises a blend of a carboxylated chlorinated polyolefin (CPO) and a commercially available paint (polyvinylchloride based paint, or styrenic block copolymer (SBC) based paint or acrylic based paint) at different weight ratios. The soft chlorinated polyolefin is compatible with polyolefin elastomer substrates and polar paint as a result of which good adhesion can be achieved. The soft chlorinated polyolefin affords the paint good flexibility, particularly for acrylic based paints as a result of which good flexibility is achieved. The inventive primerless paint also has good abrasion resistance when coated on a flexible polyolefin elastomer substrate.

What is claimed is:

1. A primerless paint composition comprising:
   5 to 30 wt % of a carboxylated chlorinated polyolefin elastomer; where the carboxylated chlorinated polyolefin elastomer is a maleic anhydride modified chlorinated propylene-α-olefin random interpolymer, formed from a propylene-α-olefin interpolymer that has a density less than 0.895 g/cm$^3$;
   5 to 60 wt % of one or more of a polyvinylchloride binder and a vinyl aromatic block copolymer binder; where the vinyl aromatic block copolymer binder comprises a styrenic block copolymer; where the styrenic block copolymer comprises styrene-isoprene-styrene block copolymer, a styrene-butadiene-styrene block copolymer, a styrene-ethylene-propylene block copolymer, a styrene-(ethylene butylene)-styrene block copolymer, or a combination thereof;
   a pigment; and
   15 to 80 wt % of a liquid carrier; where the liquid carrier is an organic solvent.

2. The paint composition of claim 1, where the carboxylated chlorinated polyolefin elastomer comprises a linear

TABLE 12

| Elastomer type | Elastomer wt % | PP 9712 wt % | VERSIFY™ 3401 wt % | Adhesion | Abrasion | Flexibility |
|---|---|---|---|---|---|---|
| INFUSE ™ 9500 | 70 | 30 | | 5B | Good | Good |
| ENGAGE ™ 8200 | 70 | 30 | | 5B | Good | Good |
| AFFINITY ™ 1450G1 | 70 | 30 | | 5B | Good | Good |
| INFUSE ™ 9500 | 70 | | 30 | 5B | Good | Good |
| ENGAGE ™ 8200 | 70 | | 30 | 5B | Good | Good |
| VERSIFY ™ 3401 | | | 100 | 5B | Good | Good | polymer or a crosslinked polymer and has an elastic modulus of less than 100 megapascals.

3. The paint composition of claim 1, where the carboxylated chlorinated polyolefin elastomer comprises a carboxylating monomer in an amount of 0.1 to 25 wt %, based on a total weight of the carboxylated chlorinated polyolefin elastomer.

4. The paint composition of claim 1, where the carboxylated chlorinated polyolefin elastomer comprises chlorination in an amount of 0.5 to 50 wt %, based on a total weight of the carboxylated chlorinated polyolefin elastomer.

5. The paint composition of claim 1, further comprising a hardener, where the hardener is an isocyanate.

6. The paint composition of claim 5, where the isocyanate is hexamethylene-1,6-diisocyanate.

* * * * *